United States Patent [19]

Ojala et al.

[11] Patent Number: 5,096,010
[45] Date of Patent: Mar. 17, 1992

[54] SUBFRAME INDUCTION NOISE REDUCTION SIDE-BRANCH REACTIVE SILENCER

[75] Inventors: William K. Ojala, Birmingham; Philip R. Guys; Masumi Kawatsu, both of Northville; John D. Kostun, Brighton, all of Mich.

[73] Assignee: Ford Motor Company, Dearborn, Mich.

[21] Appl. No.: 629,895

[22] Filed: Dec. 19, 1990

[51] Int. Cl.$^5$ .................. B60K 13/02; B60K 13/06
[52] U.S. Cl. .................. 180/68.3; 180/299; 123/52 MB; 181/229
[58] Field of Search .............. 180/68.3, 69.22, 69.23, 180/299, 300, 312, 225, 296; 55/276; 181/224, 229; 123/198 A, 198 E, 52 M, 52 MB

[56] References Cited

U.S. PATENT DOCUMENTS

| | | | |
|---|---|---|---|
| 2,299,157 | 10/1942 | Lowther | 180/68.3 |
| 2,325,352 | 7/1943 | Wilson | 181/229 |
| 4,136,756 | 1/1979 | Kawamura | 181/229 |
| 4,610,326 | 9/1986 | Kirchweger et al. | 181/224 X |
| 4,753,315 | 6/1988 | Fujisaki et al. | 180/299 |
| 4,778,029 | 10/1988 | Thornburgh | 181/229 |
| 4,790,864 | 12/1988 | Kostun | 55/276 |
| 4,800,985 | 1/1989 | Hanzawa et al. | 181/229 |
| 4,984,350 | 1/1991 | Hayashi | 180/68.3 X |

FOREIGN PATENT DOCUMENTS

| 0050819 | 3/1984 | Japan | 180/312 |
|---|---|---|---|
| 739101 | 10/1955 | United Kingdom | 180/299 |

Primary Examiner—Andres Kashnikow
Assistant Examiner—Brian L. Johnson
Attorney, Agent, or Firm—Roger L. May; Jerome R. Drouillard

[57] ABSTRACT

A noise reduction side-branch reactive silencer for use with the air induction system of an internal combustion engine. The side-branch reactive silencer is contained within a subframe interposed between the engine and a vehicle body. The subframe is a rigid structure and forms a reactive cavity therein. The subframe has a connector for communicating the reactive cavity with the air induction system of the vehicle. The connector is positioned along the subframe in accordance with the desired attenuation frequency.

10 Claims, 3 Drawing Sheets

SUBFRAME INDUCTION NOISE REDUCTION SIDE-BRANCH REACTIVE SILENCER

TECHNICAL FIELD

The present invention is directed to internal combustion engines and to the use of an engine subframe as a side-branch reactive silencer for reducing air induction noise and side-branch reactive silencer space requirements.

BACKGROUND OF INVENTION

Most present side-branch reactive silencers such as resonators and ¼-wave tuners are either integrated into the air cleaner or attached thereto and take up space in the engine compartment causing packaging, serviceability, access and/or cooling problems.

Approaches heretofore have focused on incorporating the resonator into the air cleaner construction. One such approach is the design disclosed in Kostun U.S. Pat. No. 4,790,864, which discloses a structure incorporating a resonator and a venturi into the air cleaner construction. This air cleaner/sound attenuator assembly is attached to or near the engine, and not below the engine in the waste space area, thereby compounding packaging problems.

Kawamura U.S. Pat. No. 4,136,756 discloses another example of a resonator incorporated into the air cleaner housing. The intake air muffler is intended for use with a motorcycle. The intake air muffler utilizes the muffler case as an air conduit does not rely on existing components of the vehicle to form a resonator.

Lowther U.S. Pat. No. 2,299,157 and Wilson U.S. Pat. No. 2,325,352 both disclose examples of mounting resonators in connection with the air cleaner or the intake manifold constructions. The Lowther device operates as a silencer by restricting and breaking-up sound waves rather than relying on resonant tuning. The Wilson device discloses a resonator having a side-branch design. Specifically, annular channels attach to the resonance chamber to silence noise associated with air intake. However, the Wilson resonators are not part of a subframe nor are they interposed between an engine and a vehicle body.

Thornburgh U.S. Pat. No. 4,778,029 discloses an engine air inlet and silencer directed to vehicles utilizing an engine compartment hood to form a duct to the engine air cleaner assembly. The Thornburgh device is specifically directed to a hood duct inlet and does not address the packaging concerns of the present invention.

Hanzawa et al U.S. Pat. No. 4,800,985 discloses an air intake silencer with a partially flexible side-branch tube. The side-branch tube having a closed end for attenuating high-frequency noise and a resonator chamber for attenuating low-frequency noise. However, this approach mounts to the upper portion radiator resulting in further crowding of the engine compartment. In addition, this device is constructed of many elements, increasing the complexity of the system and the likelihood for failure of the entire system caused by failure of one of the components.

In the foregoing background art no attempts have been made to combine the beneficial features of a large volume, hollow and rigid tubular engine subframe resonator. No use has been made of an existing subframe as a reactive silencer for reducing engine air intake noises and vibrations while providing for compactness and eliminating the space normally required for the resonator.

The present invention to the contrary, is directed to the use of a subframe as a reactive silencer for reducing engine noises and vibrations and also for compactness in eliminating the space normally required for the resonator.

DISCLOSURE OF INVENTION

The present invention provides the benefits of a side-branch reactive silencer, specifically, plus: improved packaging and the unique ability to attenuate multiple frequencies, reducing cost and complexity of the resonator system, while improving underhood aesthetics and serviceability. The engine subframe construction additionally provides all the beneficial features of reducing induction noise and resonator ground-out while reducing the underhood package restrictions thereby enhancing body and assembly operations and costs. The present invention is directed to, but not limited to, a hollow tubular engine subframe resonator for reducing noise, vibration and space requirements. Alternative tubular vehicle members may also be utilized, for example: the bumper or a double walled radiator support structure, vehicle frame members, etc.; provided they possess a similar hollow tubular design.

Accordingly, it is an object of this invention to reduce noise, vibration and space requirements in an engine compartment by utilizing a hollow tubular subframe on the engine as a side-branch reactive silencer.

It is a further object of this invention to provide a cost effective and easily maintainable reactive silencer for reducing engine noise.

It is another object of this invention to provide a reactive silencer interposed between the engine and the vehicular body to reduce the necessary space requirements.

Still another object of the present invention is to provide a side-branch reactive silencer for reducing engine air induction noise which provides improved serviceability and assembly operation and cost.

An additional object of the present invention is to provide a side-branch reactive silencer for reducing engine air induction noise which further enhances body and assembly operations and costs.

Another object of the present invention is to provide a side-branch reactive silencer for reducing engine air induction noise which improves underhood thermal management, i.e. cooling air flow thereby providing improved quality and minimizing system and warranty costs.

A further object of the present invention is to provide a side-branch reactive silencer for reducing engine air induction noise which by its design, reduces cooling airflow restrictions and reduces cooling noise Another object of the present invention is to provide a side-branch reactive silencer for reducing engine air induction noise while reducing cost and weight of the total assembly.

A further object of the present invention is to provide a side-branch reactive silencer for reducing engine air induction noise while reducing cooling drag, thereby improving fuel economy.

A specific object of the present invention is to provide a noise reducing side-branch reactive silencer for use with the air induction system of an internal combustion engine which is interposed between the engine and a vehicle body. The side-branch reactive silencer is comprised of the subframe which can function as either a multi-mode, ¼-wave tuner system or a side-branch resonator, with means for attaching one portion of the subframe to the vehicle body and a means for attaching another portion of the subframe to the engine. Operating as a ¼-wave system in the present embodiment, two distinct frequencies can be attenuated. The value of these frequencies depends on the location on the subframe of the connector which attaches the subframe to the air induction system and the length of the subframe tuning element. The connector operates in communication with the cavity and is positionable along the subframe in accordance with the desired attenuation frequency. The connector is adapted for communication with the air induction system.

Another specific object of the present invention is to provide a compact arrangement for a vehicle engine compartment comprising, an engine for driving the vehicle and housing an air induction system, a frame for supporting the vehicle and the engine, and a side-branch reactive silencer for reducing the induction air noise. The resonator/subframe typically at least, partially circumscribes the underside of the engine and is interposedly connected between the body structure and the engine in otherwise wasted space whereby to make the engine compartment compact.

An additional specific object of the present invention is to provide a method of reducing noise in the air induction system of an internal combustion engine supported by a subframe between the engine and a vehicle body. The steps include forming the subframe as a tubular hollow cavity configured as a reactive silencer and connecting the hollow of the cavity with the air induction system to resonate the noise.

Still another specific object of the present invention is to provide a method of packaging an engine component in combination with the vehicle on a subframe. The steps include configuring the subframe as a hollow tubular support structure and connecting the component from the subframe to the engine.

The objects, features, and advantages of the present invention are readily apparent from the following detailed description of the best mode for carrying out the invention when taken in connection with the accompanying drawings.

BEST MODE FOR CARRYING OUT THE INVENTION

Figure 1:
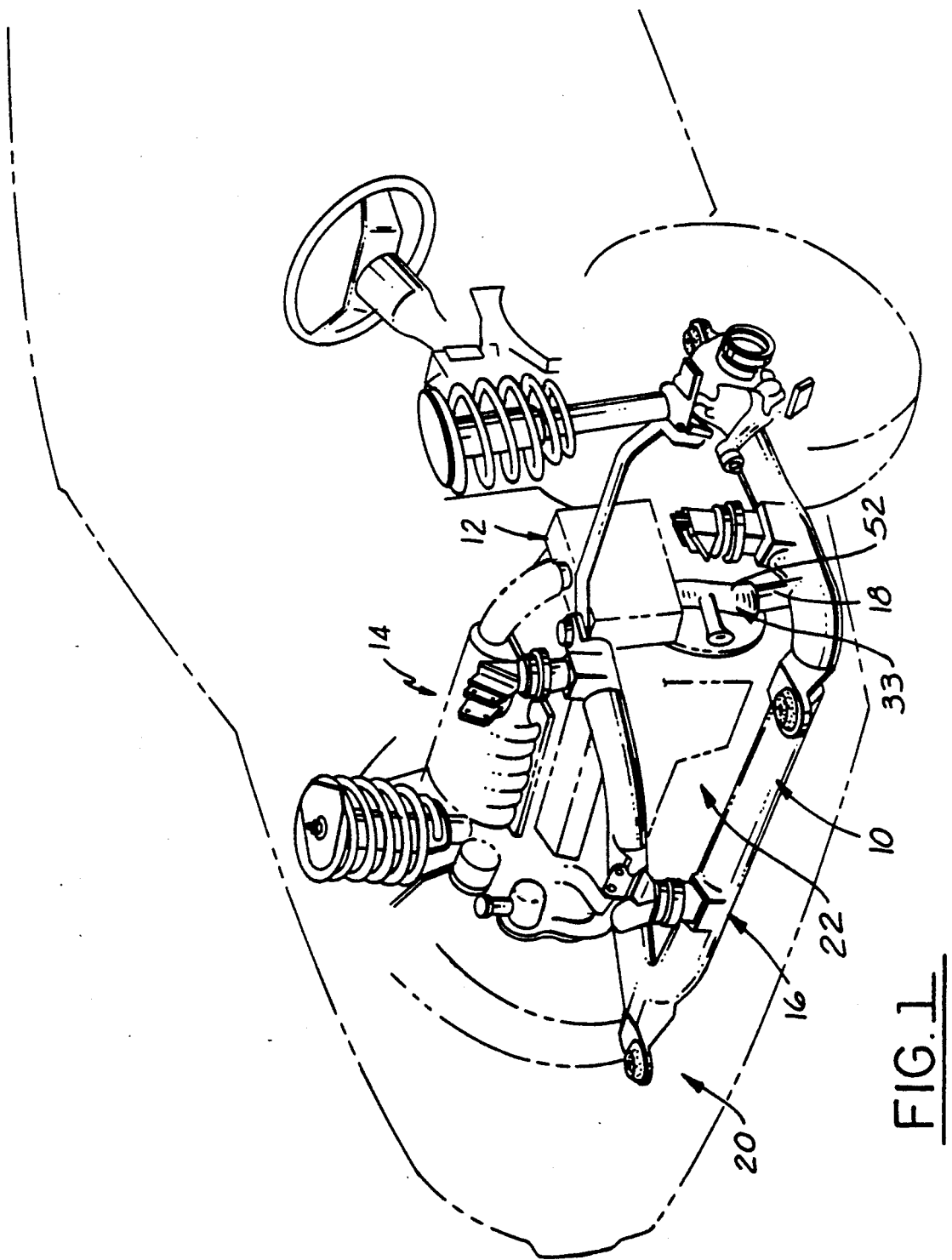
FIG. 1 is a fragmentary perspective view of a engine compartment of an automobile, showing the subframe side-branch reactive silencer interposed between the engine and the vehicle body, shown in phantom.

The embodiment illustrated in FIGS. 1-6 shows a side-branch reactive silencer 10 for use with an air induction system 12 of an internal combustion engine 14.

The side-branch reactive silencer 10 is comprised of a subframe 16 and a connector 18 which attaches the subframe 16 to the air induction system 12. The subframe 16 is interposed between the engine 14 and a vehicle body 20. The subframe 16 is generally U-shaped having a generally circular or tubular cross-section.

Figure 2:
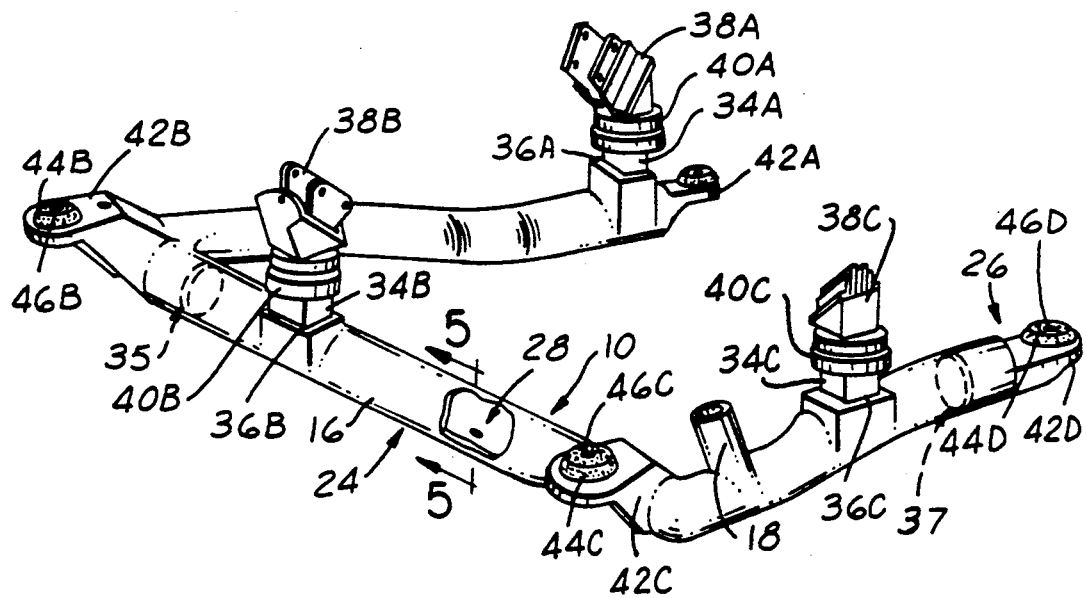
FIG. 2 is a perspective view in partial cut-away showing various features of the subframe as mounted on the vehicle body.
Figure 3:
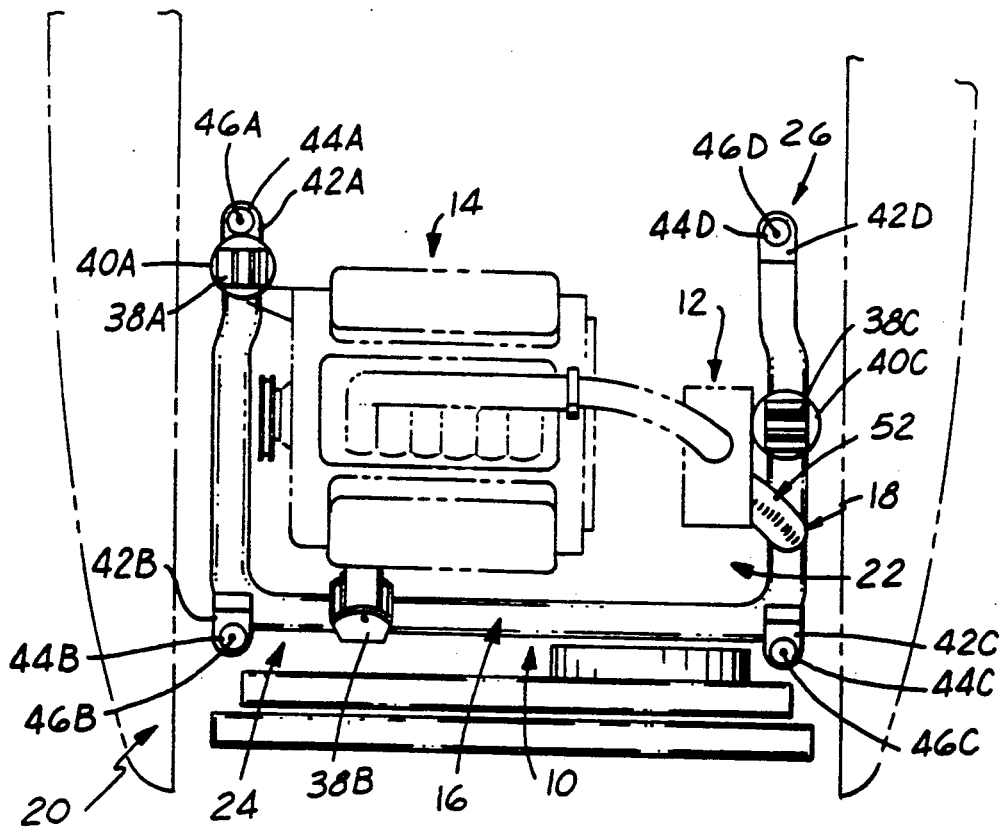
FIG. 3 is a top view of the subframe, showing its position within the engine compartment, shown in phantom.

As shown in more detail in FIGS. 2 and 3, the subframe 16 is centrally located within the engine compartment 22 and interposedly mounted such that a closed end 24 of the U-shaped subframe 16 is attached to the front of the vehicle and a typically open end 26 of the U-shaped subframe 16 faces toward the rear of the vehicle.

The subframe 16 is of a kind used within the vehicle industry which may vary from manufacturer to manufacturer and model to model. The subframe 16 is used to support the engine 14 and the vehicle suspension, as well as to secure the engine 14 via the subframe 16 to the vehicle body 20.

The subframe 16, in the present embodiment, is provided with an additional function of operating as a side-branch reactive silencer 10 by means of minor modifications to its structure. A cavity 28 of the desired size is formed by sealing sections of the existing hollow tubing of the subframe 16.

The preferred embodiment is to use a connector 18 which has the same cross-sectional area as the subframe 16 and to locate the connector 18 between the end points of the subframe 16 forming a T-section. In this configuration, each branch of the T-section 30 and 32 functions as a ¼-wave tuner. The frequency and attenuation capabilities of the ¼-wave tuners are dependent on the length and cross-section area of the branches 30 and 32 respectively. Because of the use of the existing subframe 16, the attenuated frequencies are altered by the location of the connector 18 relative to the subframe 16 and length of the enclosed subframe 16. The side-branch reactive silencer 10 of this embodiment utilizes a cross-sectional area for both the subframe 16 and its branches 30 and 32 and the connector 18 which is equal to that of a flow duct 33 having a 75 mm diameter, thereby maximizing attenuation.

Each air inlet/induction system has its own resonance characteristics which amplify the pressure pulsations (noise) generated at the intake port. The purpose of the branched ¼-wave silencer 10 is to reduce any multiple noise peaks by matching its tuned frequencies to the induction system resonances.

Figure 4:
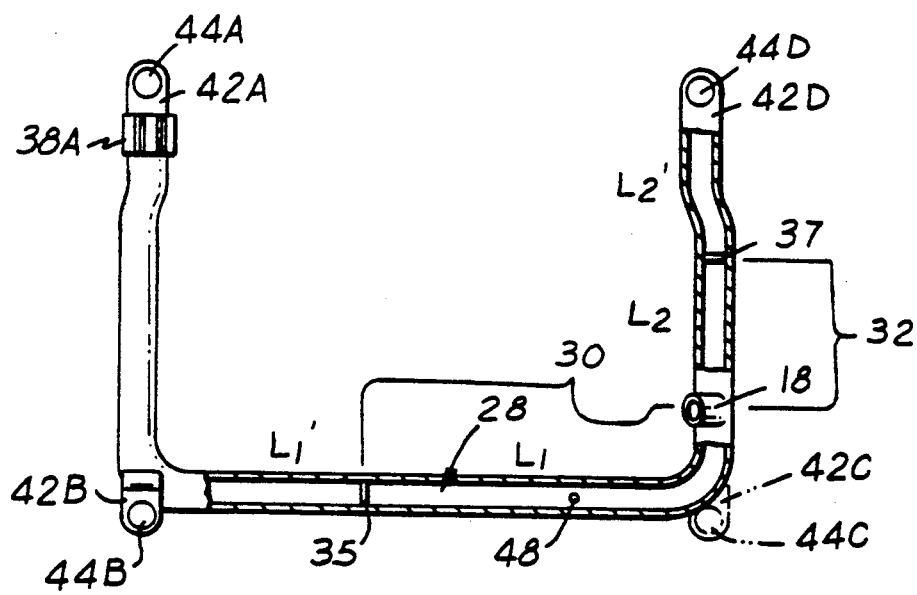
FIG. 4 is a top view of the subframe in partial cut away showing the resonator as located within the subframe.

Just as a trombone slide is moved to vary the length of pipe so as to achieve the desired frequency, the side-branch reactive silencer 10 varies the respective length of each of its branches 30 and 32; in this embodiment branches 30 and 32 flank the connector 18, to tune to the desired frequency as shown in FIG. 4.

The present embodiment of the side-branch reactive silencer 10 is a dual frequency, ¼-wave tuner system which can be tuned, using known equations, to attenuate two distinct induction system resonant frequencies. Once determined, the side-branch reactive silencer 10 can be tuned to match the induction system resonant frequencies by varying the length of each of the branches 30 and 32.

Ideally, the side-branch reactive silencer 10 will have a sufficient number of branches so as to cancel the varying number of objectional frequencies generated by the air intake system. In the present embodiment, branches 30 and 32 are tuned so as to cancel or match the frequencies generated by the air intake system of this engine design.

To optimize the side-branch reactive silencer 10 the length of the branches 30 and 32 must be such that the side-branch reactive silencer 10 operates as two ¼-wave side-branch tubes at the desired attenuation and frequencies. With reference to FIG. 4 and to the schematic showing of FIG. 6, by lengthening or shortening the branches 30 and/or 32 relative to the connector 18, for example, between $L_1$ and $L_1'$ and/or between $L_2$ and $L_2'$ the side-branch reactive silencer 10, e.g. ¼-wave tuner, can be tuned to the desired frequencies. The lengthening and/or shortening of the branches 30 and 32, formed by spaced apart ends 35 and 37 in the tubular section, affects the noise attenuation which is a function of frequency. Therefore the function of the side-branch reactive silencer 10 is optimized at a point where the branches 30 and 32 are of sufficient lengths (not necessarily uniform) to obtain the maximum attenuation at two desired frequencies.

A means for attaching the side-branch reactive silencer 10 to the engine 14 is provided on the subframe 16. With reference to FIG. 2, an engine attachment means consists of at least three vertical extension members or rectangular pillars 34A, 34B and 34C located on each of the three sides of the U-shaped subframe 16. These rectangular pillars 34A, 34B and 34C are perpendicularly mounted into matched holes 36A, 36B and 36C in the subframe 16. Engine brackets 38A, 38B and 38C are affixed to the top of the pillars 34A, 34B and 34C and oriented to centrally locate the engine 14 when connected. A series of rubber mounts 40A, 40B and 40C are interposed between the pillars 34A, 34B and 34C and the engine brackets 38A, 38B and 38C so as to isolate the engine 14 from the subframe 16.

A means for attaching the side-branch reactive silencer 10 to the vehicle body 20 is provided on the subframe 16. A body attachment means consists of four platforms 42A, 42B, 42C and 42D located at each of the four most distally opposing points of the subframe 16. Platforms 42B and 42C are brackets fastened to the subframe 16 and extend outwardly from the subframe 16 toward the front of the vehicle and are slightly raised above the subframe 16. Platforms 42A and 42D are flattened ends of the unibody construction of the subframe 16 and are located at each end of the open end 26 of the subframe 16.

A series of rubber mounts 44A, 44B, 44C and 44D are affixed to the upper surface of the platforms 42A, 42B, 42C and 42D to interpose between the subframe 16 and the vehicle body 20.

A circular hole 46A, 46B, 46C and 46D is centrally located in the platforms 42A, 42B, 42C and 44D and the rubber mounts 44A, 44B, 44C and 44D to cooperate with fastening means such as bolts to attach the subframe 16 to the vehicle body 20.

The isolation of the subframe 16 from the engine 14 by means of the rubber mounts 40A, 40B and 40C and from the vehicle body 20 by means of the rubber mounts 44A, 44B, 44C and 44D increases noise suppression and enhances efficiency of the side-branch reactive silencer 10 because it does not transmit physical vibrations from either the engine 14 or the vehicle body 20.

Figure 5:
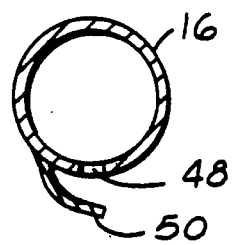
FIG. 5 is a cross-sectional view of the drain hole and guard taken along line 5—5 of FIG. 2.

As shown in FIG. 5, a series of drain holes 48 are located along the lowest portion of the cavity 28 of the subframe 16 to drain condensation which may collect in the cavity 28 of the subframe 16. The drain holes 48 are each equipped with a baffled and directional guard 50. The guards 50 prevent the drain holes 48 from becoming blocked. The guards 50 are oriented so as to direct noise away from the passenger compartment, thereby enhancing noise reduction. The use of these condensate drain holes is well known to those skilled in the art of induction system design.

The connector 18 extends from the subframe 16 to facilitate its interposition between the subframe 16 and a flexible connector hose 52 which attaches to the air induction system 12 of the vehicle. The connector 18 is generally cylindrical in shape having a circular cross-section. The connector 18 has a first end 54 which is situated such that it improves the attachment of the flexible connector hose 52 and the connector has a second end 56 which attaches the connector 18 to the subframe 16 to improve the attenuation and frequency of the side-branch reactive silencer 10 by increasing the overall volume of the cavity 28 and adding tuning length.

Figure 6:
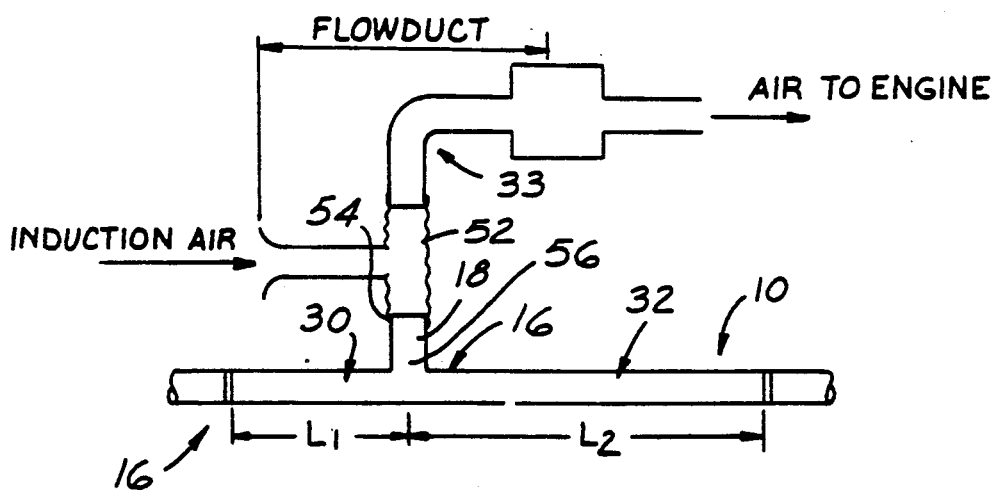
FIG. 6 is a schematic diagram of the noise reduction, side-branch reactive silencer showing the system in operation.

While the best mode for carrying out the invention has been described in detail, those familiar with the art to which this invention relates will recognize various alternative designs and embodiments for practicing the invention as defined by the following claims. For instance, FIG. 6 shows the side-branch reactive silencer incorporated in the vehicle subframe 16. It is within the scope of the invention to incorporate the silencer into alternate hollow components of a vehicle such as a bumper or a truck engine cradle, frame cross-member or radiator horsecollar.

We claim:

1. A side-branch reactive silencer for an air induction system of an internal combustion engine interposed between the engine and a vehicle body, the side-branch reactive silencer comprising:
   a subframe for supporting the engine and forming a reactive cavity within a section of the subframe;
   body attaching means for attaching one portion of the subframe to the vehicle body;
   engine attaching means for attaching another portion of the subframe to the engine; and
   a resonator connector having a first end in fluid communication with the air induction system of the internal combustion engine and a second end attached to the subframe so that the resonator connector is in fluid communication with the reactive cavity to attenuated noise from the internal combustion engine in a desired frequency.

2. The side-branch reactive silencer of claim 1 wherein the reactive cavity is generally at side-branch resonator having at least one branched ¼-wave length tube system tuned according to the desired frequency.

3. The side-branch reactive silencer of claim 1 wherein the reactive cavity in the subframe is generally elongated and provided with a pair of spaced apart ends with the resonator connector communicating therewith intermediate the reactive cavity ends to define two ¼-wave length tube systems each tuned to a different frequency.

4. The side-branch reactive silencer of claim 1, wherein the engine attaching means further comprises at least three attachment extension members extending upwardly from the subframe.

5. The side-branch reactive silencer of claim 1 wherein, the subframe further comprises a rigid structure defining a hollow tubular cavity.

6. The side-branch reactive silencer of claim 5 wherein the subframe is provided with at least one drain hole formed therein extending into the reactive cavity.

7. The side-branch reactive silencer of claim 1, wherein the body attaching means further comprises a plurality of platforms located on the subframe for attachment to the vehicle body.

8. A method of obtaining desired attenuation frequency in a reactive silencer for use with an air induction system of an internal combustion engine, comprising the steps of:
provinding a subframe with a section forming a reactive cavity, the subframes having a means for attaching one portion of the subframe to a vehicle body;
providing means for attaching another portion of the subframe to the engine;
positioning the subframe interposedly between the engine and the vehicle body;
providing a connector interposedly positioned and in fluid communication with the reactive cavity and the air induction system; and
positioning the connector along the subframe to form at least one $\frac{1}{4}$-wave tuner having a frequency tuned to match the frequency of the air induction system of the internal combustion engine.

9. The method of claim 8 wherein the positioning of the connector along the subframe further includes the steps of analyzing noise output generated by the air induction system of the internal combustion engine;
selecting at least one frequency to attenuate;
determining a desired length for the $\frac{1}{4}$-wave tuner to attenuate the selected frequency;
positioning the connector along the subframe such that the desired length exists to form the $\frac{1}{4}$-wave tuner; and
sealing the subframe to form spaced apart ends to provide the desired length for the $\frac{1}{4}$-wave tuner.

10. The method of claim 8 wherein the method of obtaining desired attenuation frequency in an air induction system of an internal combustion engine further comprises the step of forming at least two $\frac{1}{4}$-wave tuners each having a different length selected to attenuate at least two preselected frequencies of noise generated by the air induction system.

* * * * *